United States Patent
Kim et al.

(10) Patent No.: US 9,918,350 B2
(45) Date of Patent: Mar. 13, 2018

(54) METHOD FOR PERFORMING DISCOVERY STEP AND DEVICE THEREFOR

(71) Applicant: LG ELECTRONICS INC., Seoul (KR)

(72) Inventors: Hakseong Kim, Seoul (KR); Byounghoon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 85 days.

(21) Appl. No.: 14/909,653

(22) PCT Filed: Aug. 4, 2014

(86) PCT No.: PCT/KR2014/007179
§ 371 (c)(1),
(2) Date: Feb. 2, 2016

(87) PCT Pub. No.: WO2015/016690
PCT Pub. Date: Feb. 5, 2015

(65) Prior Publication Data
US 2016/0192423 A1    Jun. 30, 2016

Related U.S. Application Data

(60) Provisional application No. 61/861,436, filed on Aug. 2, 2013.

(51) Int. Cl.
*H04W 4/08* (2009.01)
*H04W 76/02* (2009.01)
(Continued)

(52) U.S. Cl.
CPC ........ *H04W 76/023* (2013.01); *H04B 7/0697* (2013.01); *H04L 5/0005* (2013.01);
(Continued)

(58) Field of Classification Search
CPC ... H04B 7/0697; H04L 5/0005; H04L 5/0023; H04L 5/0032; H04L 5/0048;
(Continued)

(56) References Cited

U.S. PATENT DOCUMENTS

2009/0303902 A1*  12/2009  Liu .................... H04L 12/189
                                                        370/254
2012/0093098 A1   4/2012  Charbit et al.
(Continued)

FOREIGN PATENT DOCUMENTS

KR    10-2011-0099805 A    9/2011
WO    WO 03/094550 A1    11/2003
(Continued)

*Primary Examiner* — Khaled Kassim
*Assistant Examiner* — Zhaohui Yang
(74) *Attorney, Agent, or Firm* — Birch, Stewart, Kolasch & Birch, LLP

(57) ABSTRACT

The present invention relates to a wireless communication system. Particularly, the present invention relates to a method and device by which a terminal performs a discovery step for D2D communication in a wireless communication system, the method comprising the steps of: receiving a first discovery signal (DS) including identification information of a target terminal from a member terminal of a first terminal group; checking whether the target terminal belongs to the first terminal group; and transmitting a second DS corresponding to the first DS, wherein if the target terminal belongs to the first terminal group, the second DS is transmitted to member terminals within the first terminal group, and if the target terminal does not belong to the first terminal group, the second DS is transmitted to a specific terminal within a second group different from the first group.

6 Claims, 17 Drawing Sheets

(51) Int. Cl.
 *H04W 8/00* (2009.01)
 *H04W 74/08* (2009.01)
 *H04B 7/06* (2006.01)
 *H04L 5/00* (2006.01)
(52) U.S. Cl.
 CPC ............ *H04W 4/08* (2013.01); *H04W 8/005* (2013.01); *H04W 74/08* (2013.01); *H04L 5/0023* (2013.01); *H04L 5/0032* (2013.01); *H04L 5/0037* (2013.01); *H04L 5/0048* (2013.01)
(58) Field of Classification Search
 CPC ...... H04L 5/0037; H04W 4/08; H04W 74/08; H04W 8/005; H04W 76/023
 See application file for complete search history.

(56) References Cited

U.S. PATENT DOCUMENTS

| | | |
|---|---|---|
| 2013/0107791 A1 | 5/2013 | Oh et al. |
| 2013/0157656 A1 | 6/2013 | Gao et al. |
| 2014/0112323 A1* | 4/2014 | Qi .................... H04W 48/10 370/338 |
| 2015/0003440 A1 | 1/2015 | Lim et al. |
| 2015/0373766 A1* | 12/2015 | Morita ................ H04W 52/383 370/330 |

FOREIGN PATENT DOCUMENTS

| | | |
|---|---|---|
| WO | WO 2012/008771 A2 | 1/2012 |
| WO | WO 2013/081370 A1 | 6/2013 |

* cited by examiner long-range discovery signal structure

Hierarchical discovery signal structure

METHOD FOR PERFORMING DISCOVERY STEP AND DEVICE THEREFOR

CROSS REFERENCE TO RELATED APPLICATIONS

This application is the National Phase of PCT/KR2014/007179 filed on Aug. 4, 2014, which claims priority under 35 U.S.C. 119(e) to U.S. Provisional Application No. 61/861,436 filed on Aug. 2, 2013, all of which are hereby expressly incorporated by reference into the present application.

FIELD OF THE INVENTION

The present invention relates to a method for performing a discovery step and a device therefor. Herein, the discovery step (or discovery procedure) includes a D2D (Device-to-Device) discovery procedure.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system. In a wireless communication system, a User Equipment (UE) may receive information from a Base Station (BS) on a Downlink (DL) and transmit information to the BS on an Uplink (UL). The UE transmits or receives data and various types of control information. Various physical channels exist according to the types and usages of information that the UE transmits or receives.

DETAILED DESCRIPTION OF THE INVENTION

Technical Objects

An object of the present invention is to provide a method for performing a discovery step (or discovery procedure) and a device therefor, which are efficient in a wireless communication system. Herein, the discovery procedure includes a D2D discovery procedure.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In an aspect of the present invention, as a method of a device for performing a discovery procedure for Device-to-Device (D2D) communication in a wireless communication system, provided herein is a method including the steps of receiving a first Discovery Signal (DS) including identification information of a target user equipment from a member user equipment of a first user equipment group; verifying whether or not the target user equipment belongs to the first user equipment group; and transmitting a second DS corresponding to the first DS, wherein, in case the target user equipment belongs to the first user equipment group, the second DS is transmitted to member user equipments within the first user equipment group, and wherein, in case the target user equipment does not belong to the first user equipment group, the second DS is transmitted to a specific user equipment within a second group that is different from the first group.

In another aspect of the present invention, as a device being configured to perform a discovery procedure for Device-to-Device (D2D) communication in a wireless communication system, provided herein is a device including a RF (Radio Frequency) unit; and a processor, wherein the processor is configured to receive a first Discovery Signal (DS) including identification information of a target user equipment from a member user equipment of a first user equipment group, to verify whether or not the target user equipment belongs to the first user equipment group, and to transmit a second DS corresponding to the first DS, wherein, in case the target user equipment belongs to the first user equipment group, the second DS is transmitted to member user equipments within the first user equipment group, and wherein, in case the target user equipment does not belong to the first user equipment group, the second DS is transmitted to a specific user equipment within a second group that is different from the first group.

Preferably, in case the target user equipment belongs to the first user equipment group, the second DS may be transmitted by using a first transmission power, and, in case the target user equipment does not belong to the first user equipment group, the second DS may be transmitted by using a second transmission power, and the first transmission power may be lower than the second transmission power.

Preferably, in case the target user equipment belongs to the first user equipment group, the second DS may be transmitted by using a first transmission resource, and, in case the target user equipment does not belong to the first user equipment group, the second DS may be transmitted by using a second transmission resource, and the first transmission resource may correspond to a shared resource shared by members within the first user equipment group, and the second transmission resource may correspond to a dedicated resource that is not shared by members within the first user equipment group.

Preferably, the resources among the user equipment groups may be multiplexed by using a SDM (Spatial Division Multiplexing) method, and the shared resource and the dedicated resource within the user equipment groups may be multiplexed by using a FDM (Frequency Division Multiplexing) method.

Preferably, the second DS may include a plurality of first DSs.

Advantageous Effects

According to the exemplary embodiments of the present invention, a discovery procedure may be efficiently performed in the wireless communication system. And, the discovery procedure includes D2D discovery procedure.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE PRESENT INVENTION

The configuration, operation, and other features of the present invention will readily be understood with embodiments of the present invention described with reference to the attached drawings. Embodiments of the present invention may be used for various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Multi-Carrier Frequency Division Multiple Access (MC-FDMA), etc. CDMA may be implemented as a radio technology such as Universal Terrestrial Radio Access (UTRA) or CDMA2000. TDMA may be implemented as a radio technology such as Global System for Mobile communications/General packet Radio Service/Enhanced Data Rates for GSM Evolution (GSM/GPRS/EDGE). OFDMA may be implemented as a radio technology such as Institute of Electrical and Electronic Engineers (IEEE) 802.11 (Wi-Fi), IEEE 802.16 (WiMAX), IEEE 802.20, Evolved UTRA (E-UTRA), etc. UTRA is a part of Universal Mobile Telecommunications System (UMTS). $3^{rd}$ Generation Partnership Project Long Term Evolution (3GPP LTE) is a part of Evolved UMTS (E-UMTS) using E-UTRA, and LTE-Advanced (LTE-A) is an evolution of 3GPP LTE.

While the embodiments of the present invention will be described below mainly in the context of a 3GPP system, this is purely exemplary and thus should not be construed as limiting the present invention.

While the present invention is described in the context of an LTE-A system, the proposed concept or methods of the present invention and embodiments of the proposed concept or methods are applicable to other multi-carrier systems (e.g., an IEEE 802.16m system) without restriction.

Figure 1:
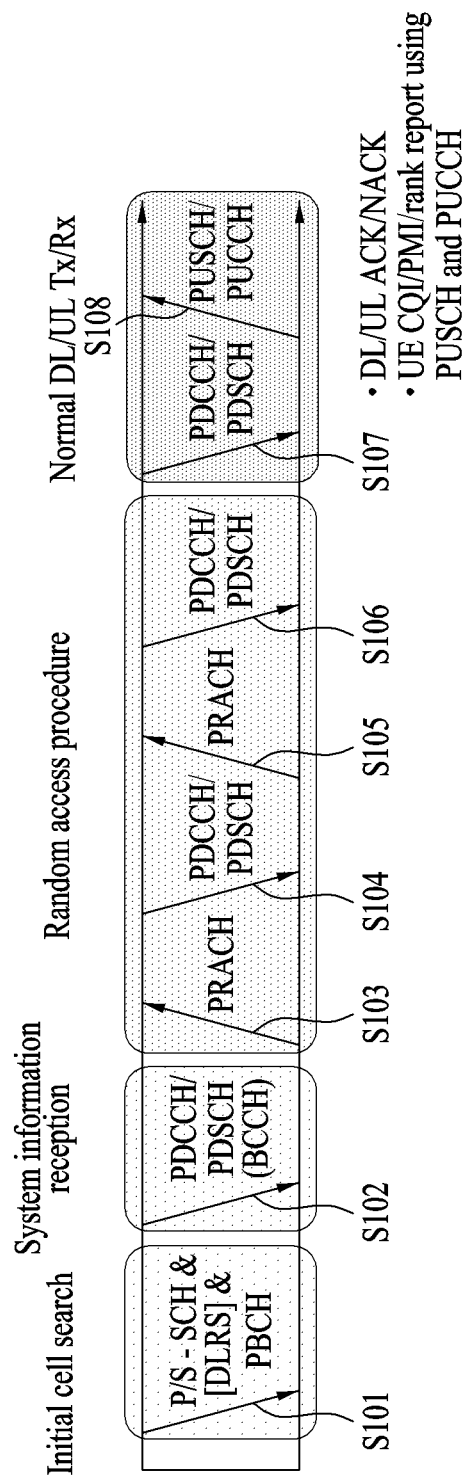
FIG. 1 illustrates physical channels and a general signal transmission method using the physical channels in a Long Term Evolution(-Advanced) (LTE-(A)) system.

FIG. 1 illustrates physical channels and a general method for transmitting signals on the physical channels in an LTE(-A) system.

Referring to FIG. 1, when a User Equipment (UE) is powered on or enters a new cell, the UE performs initial cell search in step S101. The initial cell search involves acquisition of synchronization to an evolved Node B (eNB). Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information (i.e., a Master Information Block (MIB)) broadcast in the cell by receiving a Physical Broadcast Channel (PBCH) from the eNB. During the initial cell search, the UE may monitor a Downlink (DL) channel state by receiving a DownLink Reference Signal (DL RS).

After the initial cell search, the UE acquires detailed system information (i.e. a System Information Block (SIB)) by receiving a Physical Downlink Control Channel (PDCCH) and receiving a Physical Downlink Shared Channel (PDSCH) based on information included in the PDCCH in step S102.

Then, the UE may perform a random access procedure with the eNB to complete the connection to the eNB in step S103 to S106. In the random access procedure, the UE may transmit a preamble on a Physical Random Access Channel (PRACH) (S103) and may receive a response message to the preamble on a PDCCH and a PDSCH associated with the PDCCH (S104). In the case of contention-based random access, the UE additionally performs a contention resolution procedure including transmission of a Physical Uplink Shared Channel (PUSCH) (S105) and reception of a PDCCH and its associated PDSCH (S106).

After the above procedure, the UE may receive a PDCCH/PDSCH (S107) and transmit a PUSCH/PUCCH (S108) in a general UL/DL signal transmission procedure.

Figure 2:
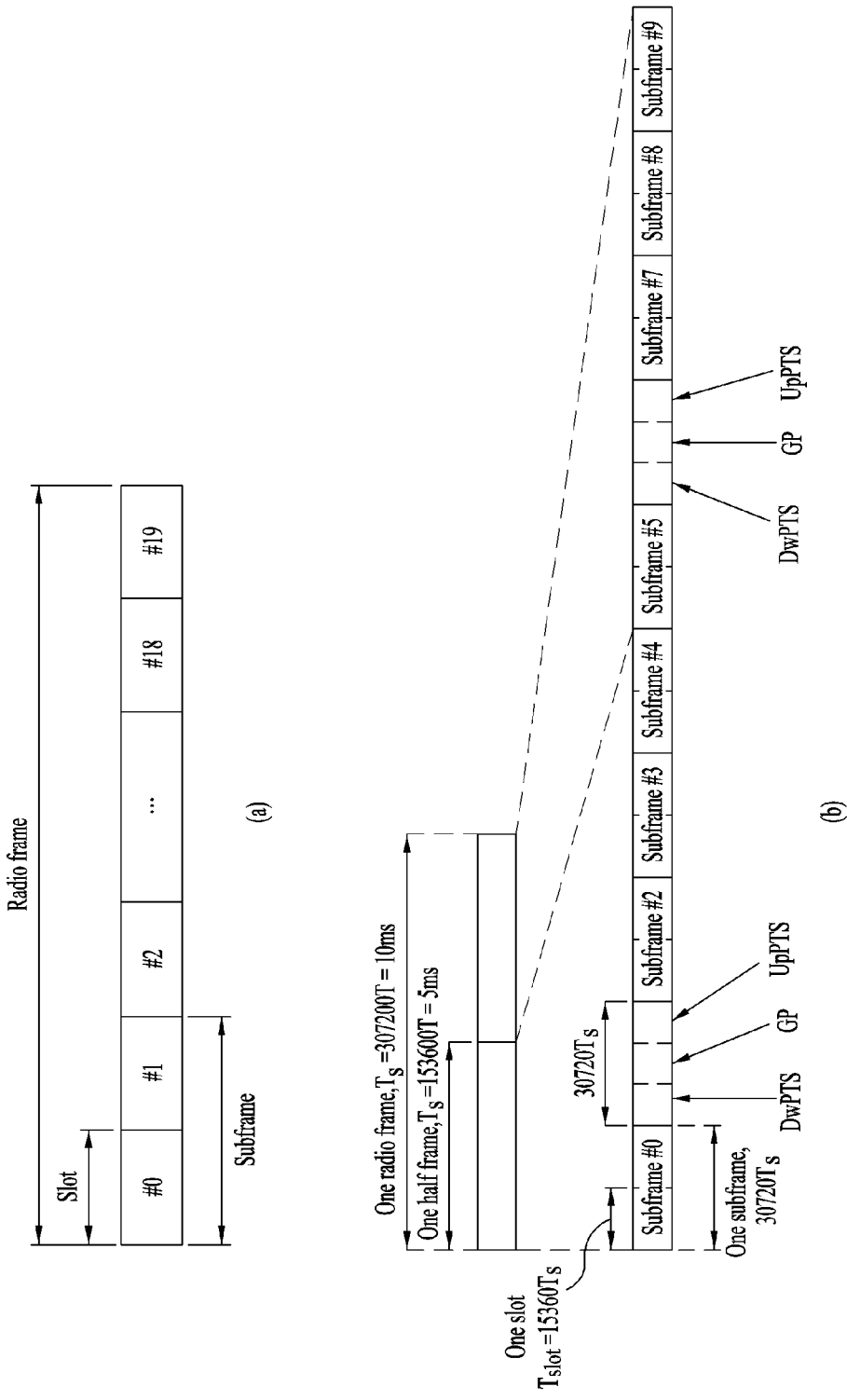
FIG. 2 illustrates a radio frame structure in the LTE(-A) system.

FIG. 2 illustrates a radio frame structure in the LTE(-A) system. The 3GPP LTE standards support a type 1 radio frame structure applicable to Frequency Division Duplex (FDD) and a type 2 radio frame structure applicable to Time Division Duplex (TDD).

FIG. 2(a) is a diagram illustrating the structure of the type 1 radio frame. An FDD radio frame includes only DL subframes or only UL subframes. The radio frame includes 10 subframes, each subframe including two slots in the time domain. One subframe may be 1 ms long and one slot may be 0.5 ms long. One slot includes a plurality of (DL) OFDM symbols or a plurality of (UL) SC-FDMA symbols in the time domain.

FIG. 2(b) illustrates the structure of the type 2 radio frame. A TDD radio frame includes two half frames, each half frame including four (five) general subframes and one (zero) special subframe. The general subframes are used for UL or DL according to a UL-DL configuration and the special subframe includes a Downlink Pilot Time Slot (DwPTS), a Guard Period (GP), and an Uplink Pilot Time Slot (UpPTS). In the special subframe, DwPTS is used for initial cell search, synchronization, or channel estimation at a UE. UpPTS is used for an eNB to perform channel estimation and acquire UL synchronization with a UE. The GP is used to cancel UL interference between a UL and a DL, caused by the multi-path delay of a DL signal. A subframe includes two slots.

Figure 3:
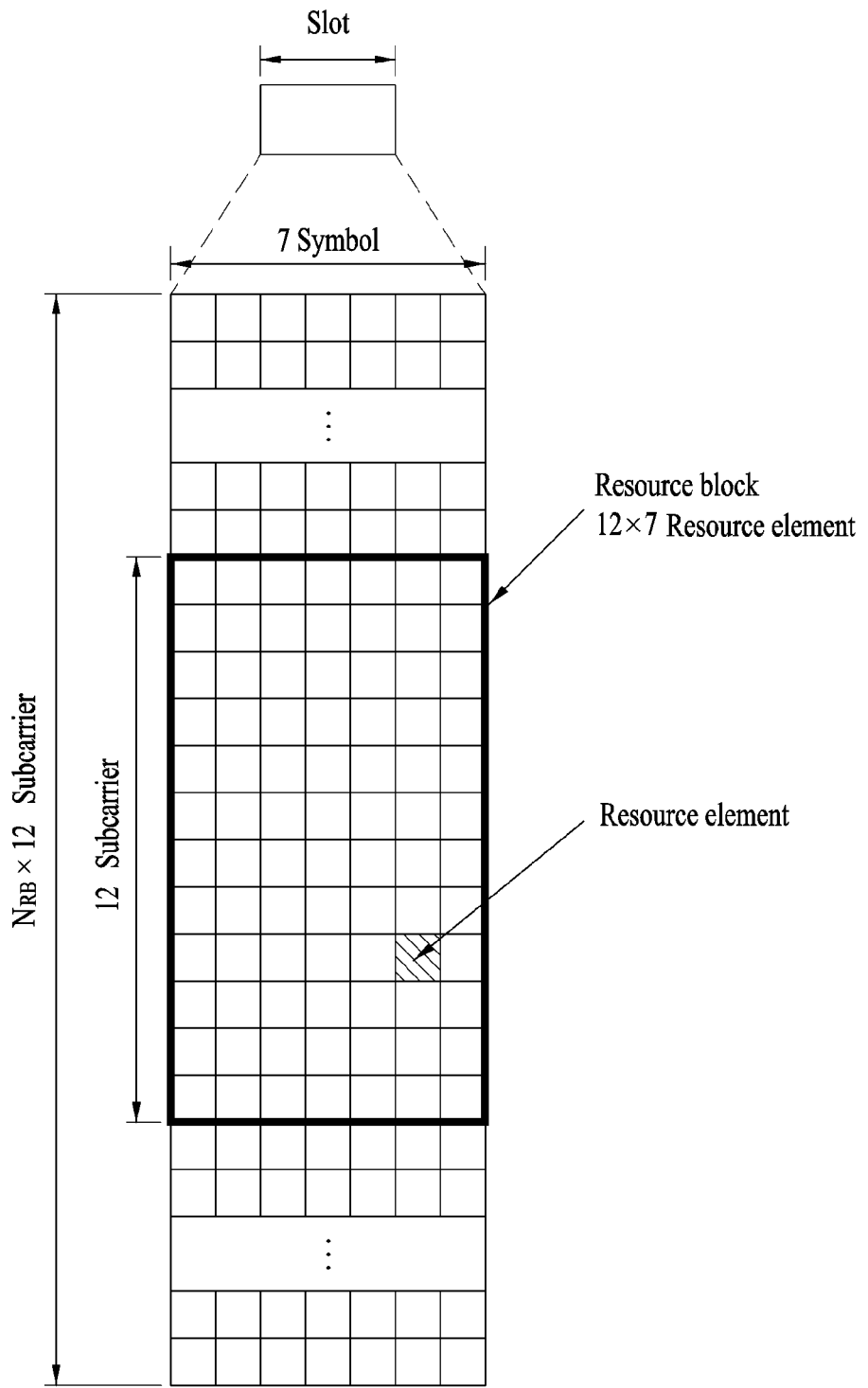
FIG. 3 illustrates a resource grid for the duration of a slot.

FIG. 3 illustrates a resource grid for the duration of one slot. A slot includes a plurality of symbols (e.g., OFDM symbols or SC-FDMA symbols), for example, 6 or 7 symbols in the time domain by a plurality of Resource Blocks (RBs) in the frequency domain. Each RB includes 12 subcarriers. Each element of a resource grid is called a Resource Element (RE). The RE is a minimum resource unit for signal transmission and one modulation symbol is mapped to an RE.

Figure 4:
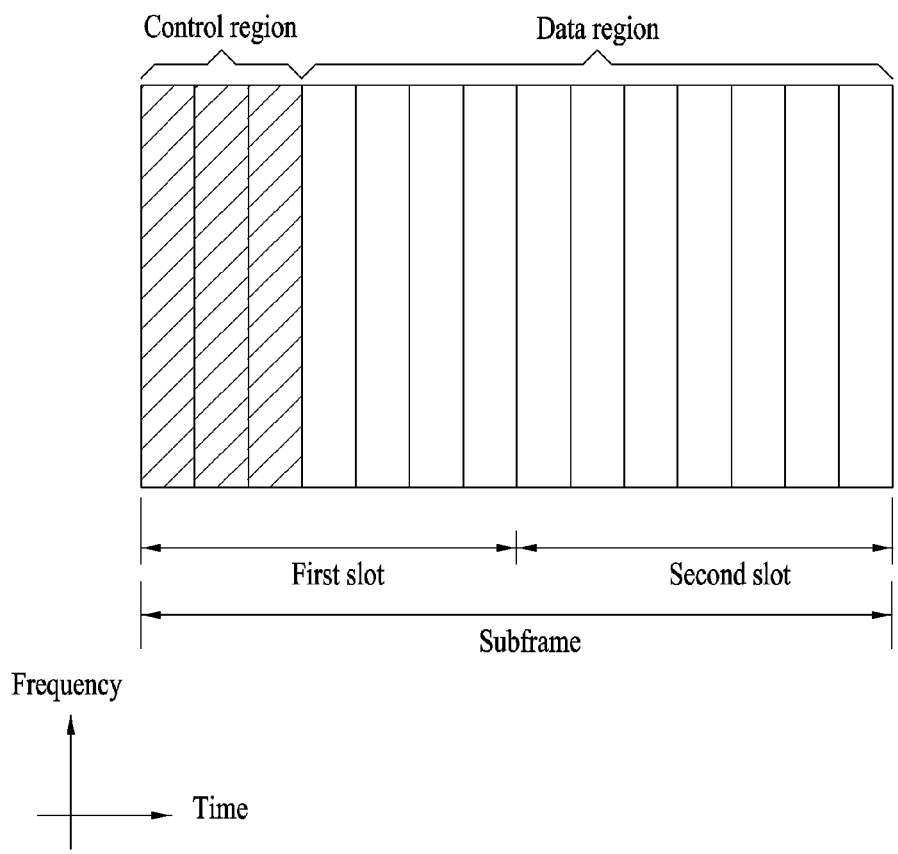
FIG. 4 illustrates an exemplary Downlink (DL) SubFrame (SF) structure.

FIG. 4 illustrates a structure of a DL subframe. Up to 3 (or 4) OFDM symbols at the start of the first slot of a DL subframe are used as a control region to which a control channel is allocated and the remaining OFDM symbols of the DL subframe are used as a data region to which a shared channel (e.g., a PDSCH) is allocated. DL control channels include a Physical Control Format Indicator Channel (PCFICH), a PDCCH, a Physical Hybrid automatic repeat request (ARQ) Indicator Channel (PHICH), etc.

The PCFICH is located in the first OFDM symbol of a subframe, carrying information about the number of OFDM symbols used for transmission of control channels in the subframe. The PHICH occupies 4 RE Groups (REGs) distributed equally in the control region based on a cell Identifier (ID). The PCFICH indicates a value ranging 1 to 3 (or 2 to 4) and is modulated in Quadrature Phase Shift Keying (QPSK). The PHICH delivers an HARQ ACKnowledgment/Negative ACKnowledgment (ACK/NACK) signal as a response to a UL transmission. The PHICH is allocated to the remaining REGs of one or more OFDM symbols corresponding to a PHICH duration, except for REGs carrying Cell-specific Reference Signals (CRSs) and the PCFICH (the first OFDM symbol). The PHICH is allocated to 3 REGs distributed as much as possible in the frequency domain.

The PDCCH delivers information about resource allocation and a transport format for a Downlink Shared Channel (DL-SCH), information about resource allocation and a transport format for an Uplink Shared Channel (UL-SCH), paging information of a Paging Channel (PCH), system information on the DL-SCH, information about resource allocation for a higher-layer control message such as a random access response transmitted on the PDSCH, a set of transmission power control commands for individual UEs of a UE group, a Transmit Power Control (TPC) command, Voice Over Internet Protocol (VoIP) activation indication information, etc. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel. A CCE includes a plurality of REGs. The format of a PDCCH and the number of available bits for the PDCCH are determined according to the number of CCEs.

Control information transmitted on a PDCCH is called Downlink Control Information (DCI). Various DCI formats are defined according to the usages of the DCI. Specifically, DCI formats 0 and 4 (a UL grant) are defined for UL scheduling and DCI formats 1, 1A, 1B, 1C, 1D, 2, 2A, 2B, and 2C (a DL grant) are defined for DL scheduling. Depending on its usage, a DCI format selectively includes information such as a hopping flag, an RB assignment, a Modulation Coding Scheme (MCS), a Redundancy Version (RV), a New Data Indicator (NDI), a TPC, a cyclic shift, a DeModulation Reference Signal (DM-RS), a Channel Quality Information (CQI) request, an HARQ process number, a Transmitted Precoding Matrix Indicator (TPMI), Precoding Matrix Indicator (PMI) confirmation, etc.

The base station decide a PDCCH format in accordance with control information that is to be transmitted to the user equipment (UE) and adds a CRC (cyclic redundancy check) for error detection to the control information. The CRC is masked by using an identifier (e.g., RNTI (radio network temporary identifier)) in accordance with the owner or purpose (or usage) of the PDCCH. In other words, the PDCCH is CRC-scrambled by using an identifier (e.g., RNTI). For example, in case the PDCCH corresponds to a PDCCH for a specific user equipment, the UE identifier (e.g., cell-RNTI, C-RNTI) may be masked to the CRC. In case the PDCCH corresponds to a PDCCH for a paging message, a paging identifier (e.g., paging-RNTI, P-RNTI) may be masked to the CRC. In case the PDDCH corresponds to a PDCCH for system information (e.g., System Information Block (SIB)), an SI-RNTI (System Information RNTI) may be masked to the CRC. In case the PDDCH corresponds to a PDCCH for a Random Access response, a RA-RNTI (Random Access-RNTI) may be masked to the CRC.

Figure 5:
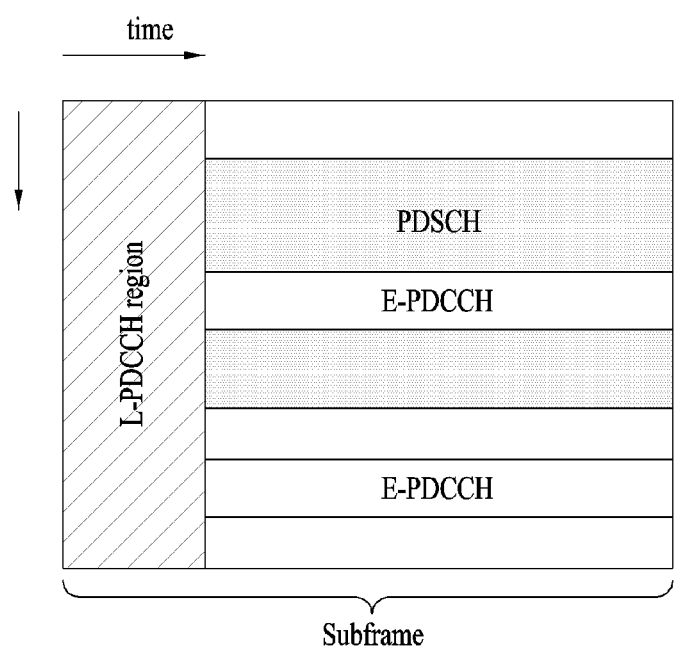
FIG. 5 illustrates an example of allocating Enhanced Physical Downlink Control Channels (E-PDCCHs) to an SF.

FIG. 5 illustrates an example of allocating Enhanced PDCCHs (E-PDCCHs) to a subframe. A legacy LTE system has limitations such as transmission of a PDCCH in limited OFDM symbols. Accordingly, LTE-A has introduced the E-PDCCH for more flexible scheduling.

Referring to FIG. 5, a PDCCH conforming legacy LTE (-A) (referred to as a legacy PDCCH or L-PDCCH) may be allocated to a control region (refer to FIG. 4). An L-PDCCH region means a region to which an L-PDCCH may be allocated. The L-PDCCH region may refer to a control region, a control channel resource region (i.e., CCE resources) to which a PDCCH may be actually allocated, or a PDCCH SS depending on the context. A PDCCH may be additionally allocated to a data region (refer to FIG. 4). The PDCCH allocated to the data region is referred to as an E-PDCCH. As illustrated in FIG. 5, a scheduling constraint imposed by the limited control channel resources of the L-PDCCH region may be relieved by additionally securing control channel resources through the E-PDCCH. An E-PDCCH and a PDSCH are multiplexed in Frequency Division Multiplexing (FDM) in the data region.

Specifically, the E-PDCCH may be detected/demodulated based on DM-RS. The E-PDCCH is transmitted in a Physical Resource Block (PRB) pair along the time axis. If E-PDCCH-based scheduling is configured, a subframe in which an E-PDCCH will be transmitted/detected may be indicated. The E-PDCCH may be configured only in a USS. A UE may attempt to detect DCI only in an L-PDCCH CSS and an E-PDCCH USS in a subframe allowed to carry an E-PDCCH (hereinafter, an E-PDCCH subframe) and in an L-PDCCH CSS and an L-PDCCH USS in a subframe not allowed to carry an E-PDCCH (hereinafter, a non-E-PDCCH subframe).

Like the L-PDCCH, the E-PDCCH delivers DCI. For example, the E-PDCCH may deliver DL scheduling information and UL scheduling information. An E-PDCCH/PDSCH operation and an E-PDCCH/PUSCH operation are performed in the same manner as/a similar manner to steps S107 and S108 of FIG. 1. That is, a UE may receive an E-PDCCH and receive data/control information on a PDSCH corresponding to the E-PDCCH. In addition, the UE may receive an E-PDCCH and transmit data/control information on a PUSCH corresponding to the E-PDCCH. In the legacy LTE system, a PDCCH candidate region (a PDCCH SS) is reserved in a control region and a PDCCH for a specific UE is transmitted in a part of the PDCCH SS. Therefore, a UE may detect its PDCCH in the PDCCH SS by blind decoding. Similarly, an E-PDCCH may also be transmitted in all or a part of reserved resources.

Figure 6:
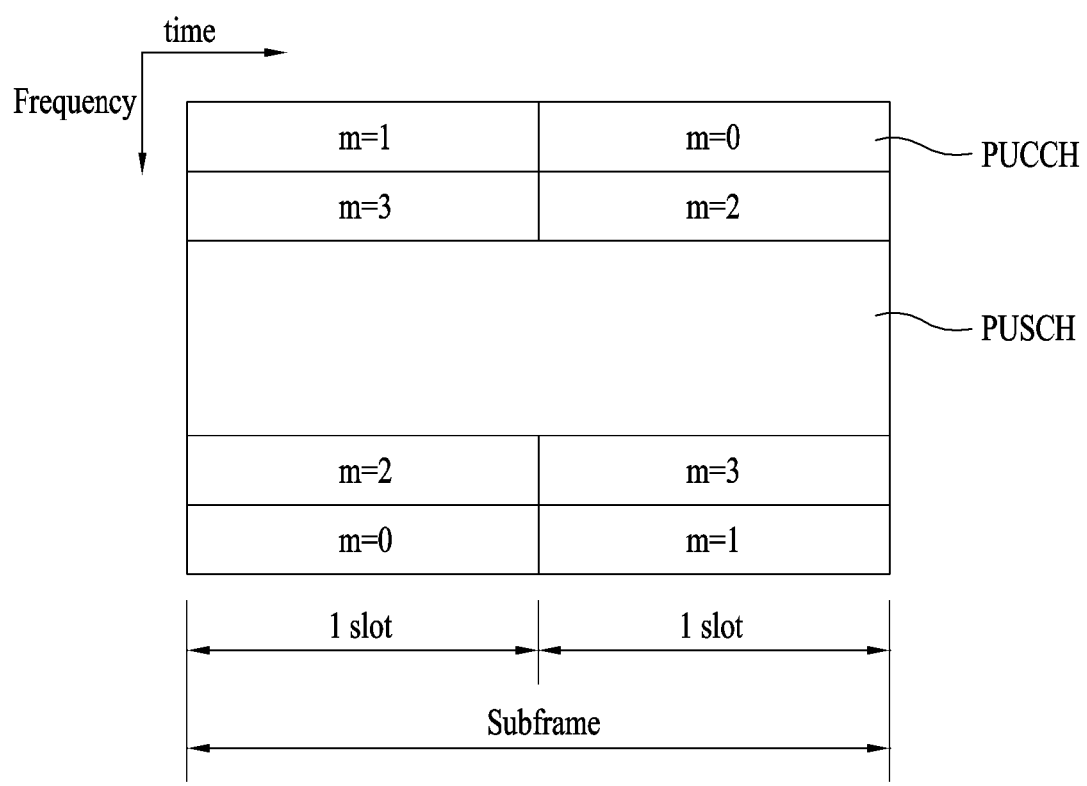
FIG. 6 illustrates an Uplink (UL) SF structure.

FIG. 6 illustrates a structure of a UL subframe in the LTE system.

Referring to FIG. 6, a UL subframe includes a plurality of slots (e.g. 2 slots). Each slot may include a different number of SC-FDMA symbols according to a Cyclic Prefix (CP) length. The UL subframe is divided into a control region and a data region in the frequency domain. A PUSCH carrying a data signal such as voice or the like is transmitted in the data region, and a PUCCH carrying Uplink Control Information (UCI) is transmitted in the control region. The PUCCH includes an RB pair located at both ends of the data region along the frequency axis and hops over a slot boundary.

The PUCCH may carry the following control information.
Scheduling Request (SR): information used to request UL-SCH resources. The SR is transmitted in On-Off Keying (OOK).
HARQ response: a response signal to a DL data block (e.g., a Transport Block (TB)) or a CodeWord (CW) on a PDSCH. The HARQ response indicates whether the DL data block has been received successfully. A 1-bit ACK/NACK is transmitted as a response to a single DL codeword and a 2-bit ACK/NACK is transmitted as a response to two DL codewords. An HARQ ACK/NACK and an HARQ-ACK may be interchangeably used in the same meaning of an HARQ response.
Channel Quality Indicator (CSI): feedback information for a DL channel. MIMO-related feedback information includes an RI and a PMI. The CQI occupies 20 bits per subframe.

Figure 7:
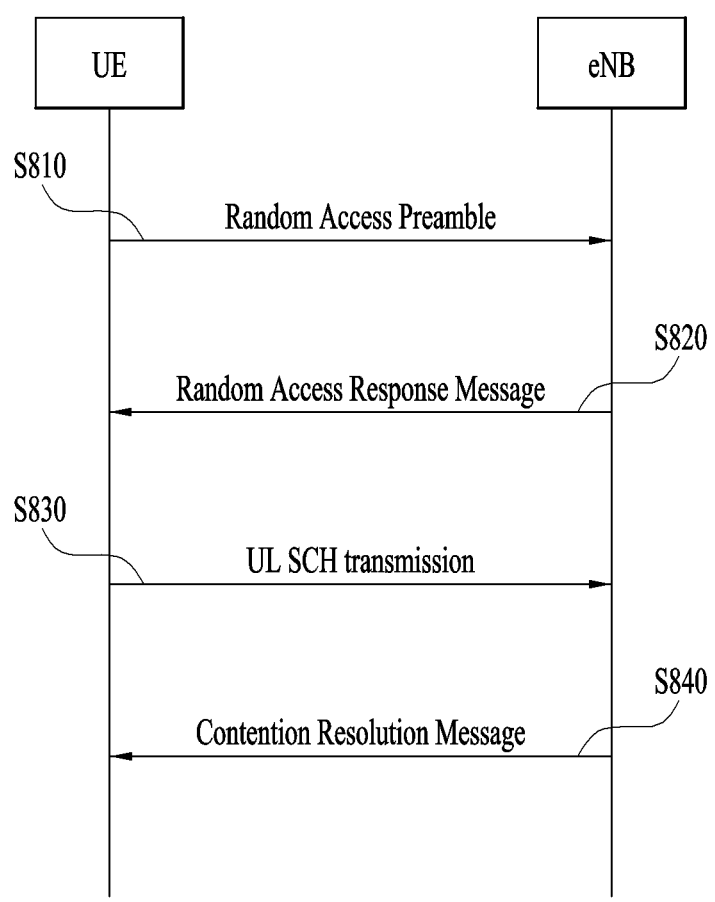
FIG. 7 illustrates a Random Access Procedure.

FIG. 7 illustrates a random access procedure. The random access procedure is used to transmit UL short data. For example, upon occurrence of initial access in Radio Resource Control (RRC)_IDLE mode, initial access after Radio Link Failure (RLF), or handover requiring random access, or upon generation of UL/DL data requiring random access in RRC_CONNECTED mode, the random access procedure is performed. The random access procedure is performed in a contention-based manner or a non-contention-based manner.

Referring to FIG. 7, a UE receives random access information from an eNB by system information and stores the received random access information. Subsequently, when random access is needed, the UE transmits a random access preamble (message 1 or Msg1) to the eNB on a PRACH (S810). Upon receipt of the random access preamble from the UE, the eNB transmits a random access response message (message 2 or Msg2) to the UE (S820). Specifically, DL scheduling information for the random access response message is CRC-masked by a Random Access-RNTI (RA-RNTI) and transmitted on a PDCCH. Upon receipt of the DL scheduling signal masked by the RA-RNTI, the UE may receive the random access response message on a PDSCH. Then, the UE determines whether a Random Access Response (RAR) directed to the UE is included in the random access response message. The RAR includes a Timing Advance (TA), UL resource allocation information (a UL grant), a temporary UE ID, etc. The UE transmits a UL-SCH message (message 3 or Msg3) to the eNB according to the UL grant (S830). After receiving the UL-SCH message, the eNB transmits a contention resolution message (message 4 or Msg4) to the UE (S840).

The above-described LTE communication type wireless communication concentrates on the communication method between a base station and a user equipment. Recently, however, request for developing technologies related to Device-to-Device (D2D) has been growing. D2D allows diverse functions to be realized starting from a simple function of transmitting and receiving signals (e.g., Discovery Signals) to a function of transmitting and receiving large capacity files (e.g., Direct communication), and, by using such functions, diverse services are available. For example, a group communication service, which allows multiple users to simultaneously perform communication based upon a function allowing a user equipment to transmit a signal or data to a plurality of specific or non-specific user equipments, may be realized. Additionally, as an example of direct communication, a user equipment (UE) performing a function of a UE-based relay station, i.e., a UE relay may be used. For example, in case D2D communication is not possible, among a plurality of candidate UEs, a user equipment (UE) that is capable of performing relay may be allowed to perform communication relay. Additionally, function and service extension is available starting from Peer to Peer (P2P) communication to Many to Many communication (M2M), and, by realizing a mesh network structure, distributed communication may be performed.

Figure 8:
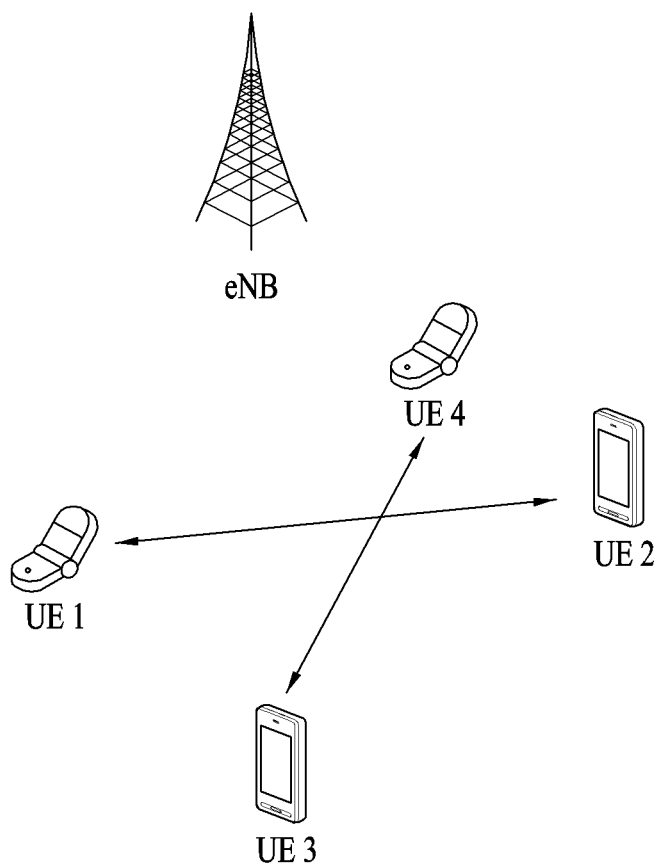
FIG. 8 illustrates an example of Device-to-Device (D2D) communication.

FIG. 8 illustrates an example of D2D (Device-to-Device) communication. D2D corresponds to a technology allowing messages to be directly transmitted and received between user equipments without passing through the network (e.g., base station). Referring to FIG. 8, UE1 and UE2 perform direct communication between one another, and UE3 and UE4 also perform direction between one another. By using an adequate control signal, the base station may perform control of time/frequency resource positions, transport power (or transmission power), and so on, for the direct communication between the user equipments. D2D may also be referred to as Device-to-Device communication or UE direction communication.

In order to initiate/connect D2D communication, the user equipment shall first search for (or discover) another user equipment located within a close range. The procedure for searching for another user equipment located within a close range is referred to as a discovery procedure. Although the present invention will not be limited only to this, the discovery procedure may be carried out as described below.

(i) When required (e.g., in case D2D communication is to be initiated), a user equipment (hereinafter referred to as a Discovery D2D UE) may transmit a pre-defined radio signal (hereinafter referred to as a Discovery Signal) in order to discover another user equipment (hereinafter referred to as a Discovery Target D2D UE) located within a close range. The Discovery Signal may include identification information of the Discovery D2D UE (e.g., UE ID).

(ii) In case the Discovery Signal is received, the Discovery Target D2D UE may transmit a response signal to the Discovery D2D UE. The response signal may correspond to a Discovery Signal of the Discovery Target D2D UE. The response signal may include identification information of the Discovery Target D2D UE (e.g., UE ID).

(iii) The Discovery D2D UE and the Discovery Target D2D UE may negotiate/exchange UE capability in order to establish a direct communication path between one another.

The discovery procedure may be carried out by receiving help from the network or may be carried out without any help from the network. In case the D2D UE discovers another D2D UE with which the D2D UE wishes to perform D2D communication, the D2D connection establishment procedure may be carried out. If the D2D communication is established, data may be exchanged between one another through the direct communication path between the D2D UEs.

Exemplary Embodiment

The main functions of D2D are direct discovery and direct communication. Direct discovery refers to finding out (or discovering) the presence of a proximity UE in a situation where no help or minimized help is received from an existing infrastructure or network. In order to do so, the UE directly transmits a DS (discovery signal) to its counterpart UE so as to allow the counterpart UE to the current position and presence or absence of the UE itself.

Figure 9:
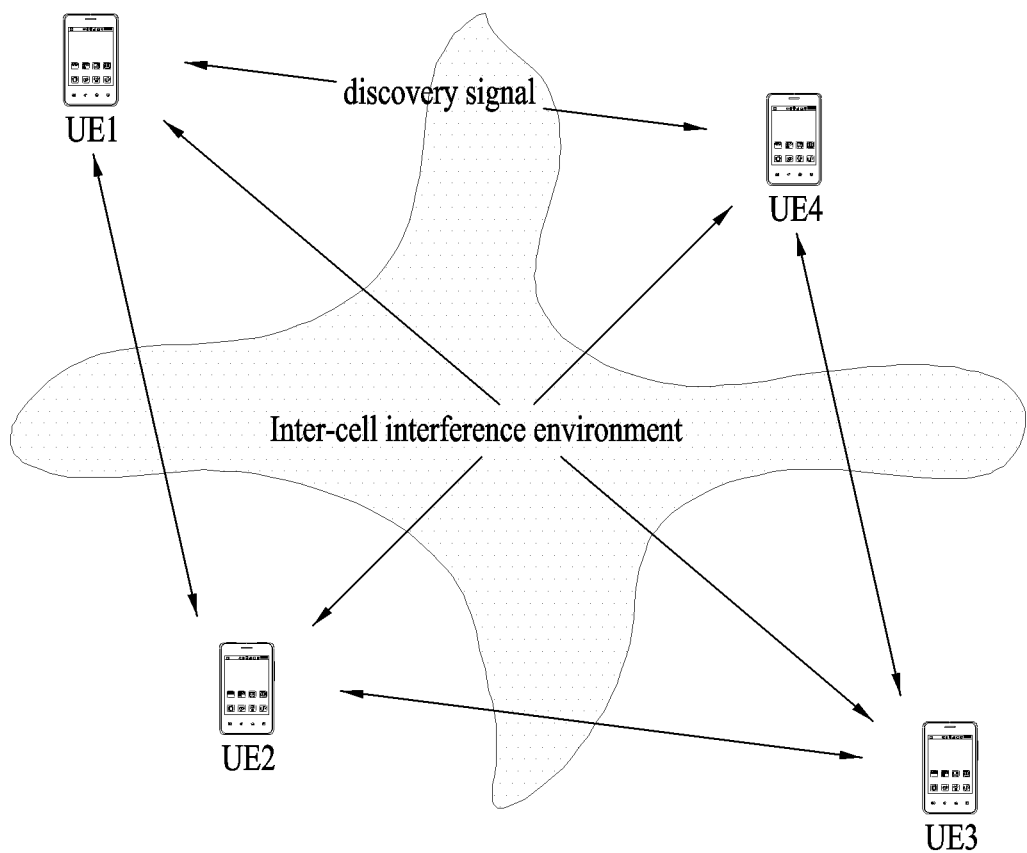
FIG. 9 illustrates an interference environment respective to a DS (Discovery Signal) transmission.

FIG. 9 illustrates an interference environment respective to a DS transmission. Referring to FIG. 9, when multiple UEs simultaneously transmit DSs, considerable interference may occur between the DSs, and, because of this, the likelihood of failure in the discovery procedure may be increased. For example, in case a DS is transmitted at a high transmission power in order to discover a long-ranged UE, this may cause interference on another DS of the same resource, a DS of a neighboring band, or another signal. Therefore, by performing time division (i.e., TDM) on the DS transmission of multiple UEs, influence resulting from the interference between DSs may be alleviated to a certain level. However, this may cause an increase in latency. Additionally, if the number of UEs increases, since the level of interference between DSs also increases accordingly, enhancement is required to be made so that individual UEs can directly transmit the DS, if the number of UEs reaches or exceeds a predetermined number.

In order to resolve the above-described problem, the present invention proposes a solution (or scheme) of dividing a D2D UE to a plurality of layers and adaptively performing the DS in accordance with the layered structure. For example, D2D UEs may be divided into a plurality of groups, and one agent UE (simply referred to as a group agent, agent) may be configured for each group (2-layer structure). A UE (or UEs) within a group may be referred to as member UE(s) (simply referred to as a group member or member). In accordance with the context, a group member UE may collectively signify the entire UEs (i.e., including the agent UE) within the group or may collectively signify the remaining UEs within the group excluding the agent UE. In this case, when performing discovery of a long-ranged UE, by having the agent UEs deliver DSs to and from one another by using available exclusive resources, less inter-cell signal interference and other band interference may be caused. Conversely, when performing discovery of a short-ranged DS, by allowing the group member UE to transmit a DS at a low transmission power, the entire time-frequency may be re-used. For convenience, the DS transmitted from an agent UE is referred to as a LR-DS (Long Range DS), and the DS transmitted from a group member UE is referred to as a SR-DS (Short Range DS). The information/format of the LR-DS and SR-DS may be identical to one another or different from one another.

Figure 10:
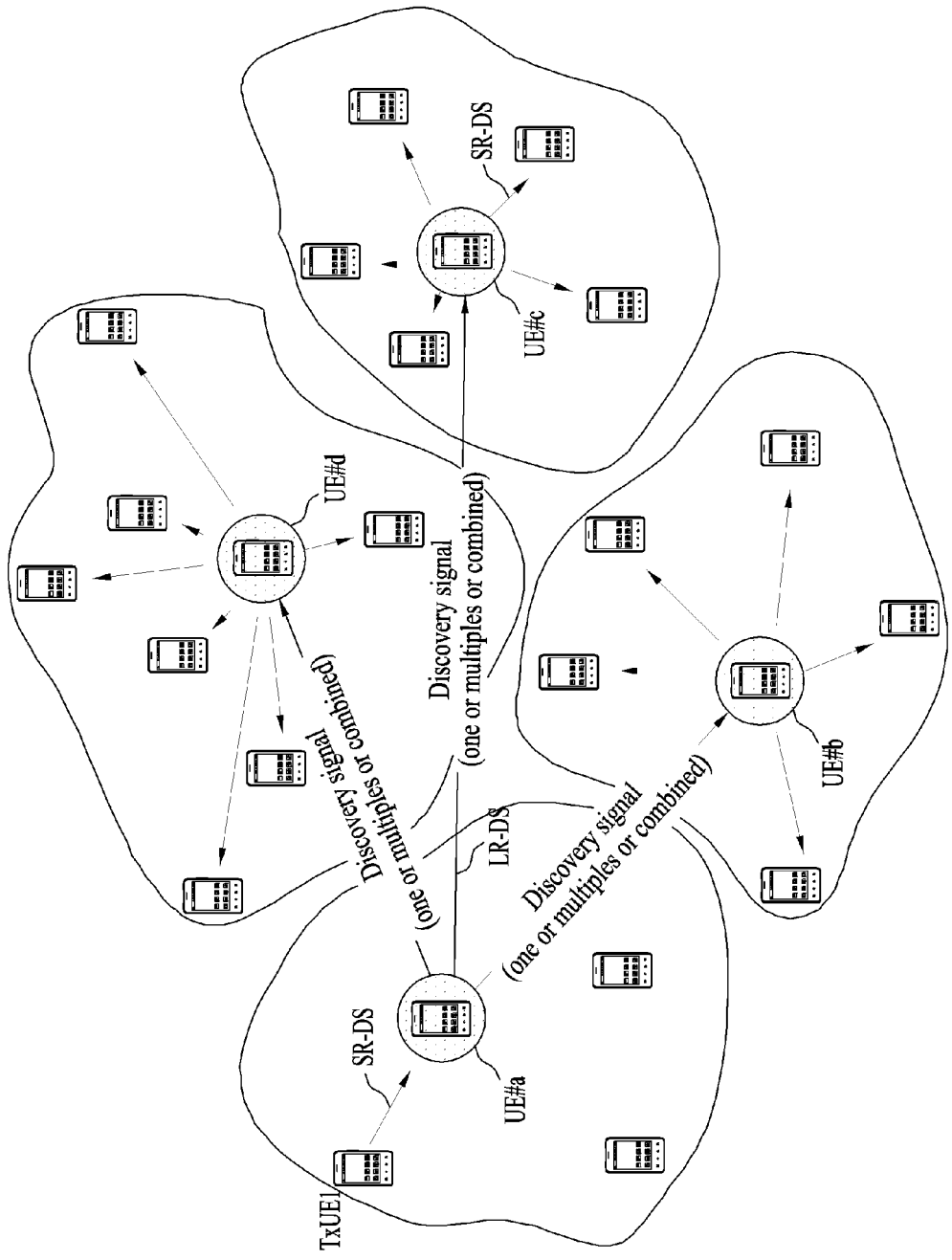
FIG. 10 illustrates an example of a DS transmission procedure by using a hierarchical (or layered) structure according to the present invention.

FIG. 10 illustrates an example of a DS transmission procedure by using a hierarchical (or layered) structure. Although this drawing illustrates a case of configuring/managing a UE group for each region, this is merely exemplary, and, therefore, the UE groups is not necessarily required to be configured/managed for each region. Referring to FIG. 10, an agent UE (UE#a, b, c) may be designated for each group, and a LR-DS may be delivered by using an (available) exclusive resource by passing through the agent UE. In this case, the agent UE (e.g., UE#b, c, d) of each group may deliver the received signal (i.e., LR-DS) directly to the member of its own group without modification or may reconfigure the received signal (i.e., LR-DS) (e.g., reconfigure the content, format, and so on) and then deliver the reconfigured signal.

Figure 11:
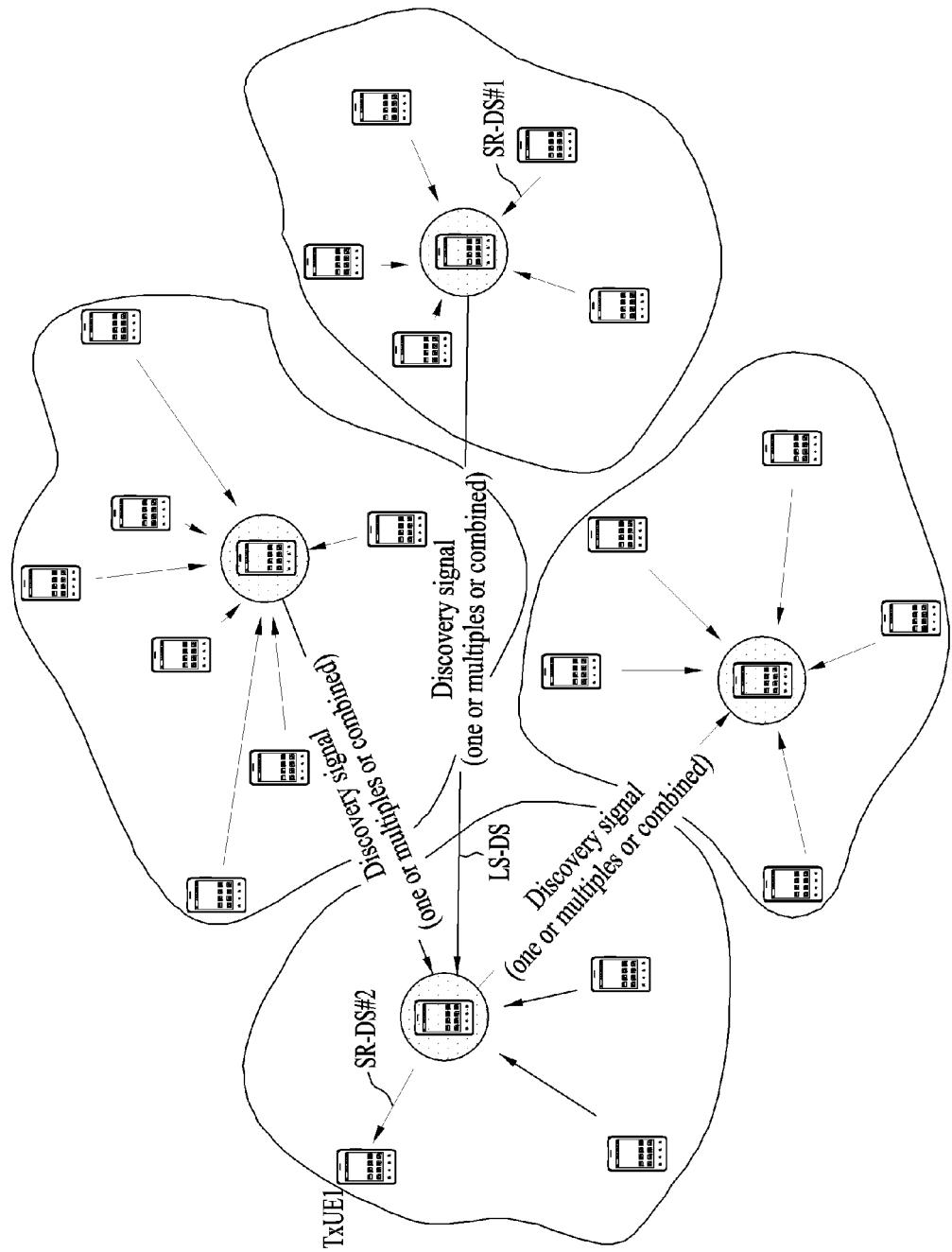
FIG. 11 illustrates an exemplary procedure of monitoring/receiving a DS according to the present invention.

FIG. 11 illustrates an exemplary procedure of monitoring/receiving a DS as Tx UE1. Referring to FIG. 11, the member of a group to which Tx UE1 belongs may directly deliver DSs to Tx UE1 without passing through the group agent. However, if a member of another group wishes to deliver a DS to Tx UE1, the member of the other group may deliver SR-DS#1 to the agent of its own group, and, then, the group agent may deliver a LR-DS respective to SR-DS#1 to a group agent of Tx UE1, and, then, the group agent of Tx UE1 may deliver SR-DS#2 respective to the LR-DS to Tx UE1. In order to do so, the group agent manages/maintains information related to a group member of the group, which is managed by the group agent itself, and the LR-SR-DS may include identification information of a transmission UE (e.g., group member, group agent) and identification information of a target UE.

Figure 12:
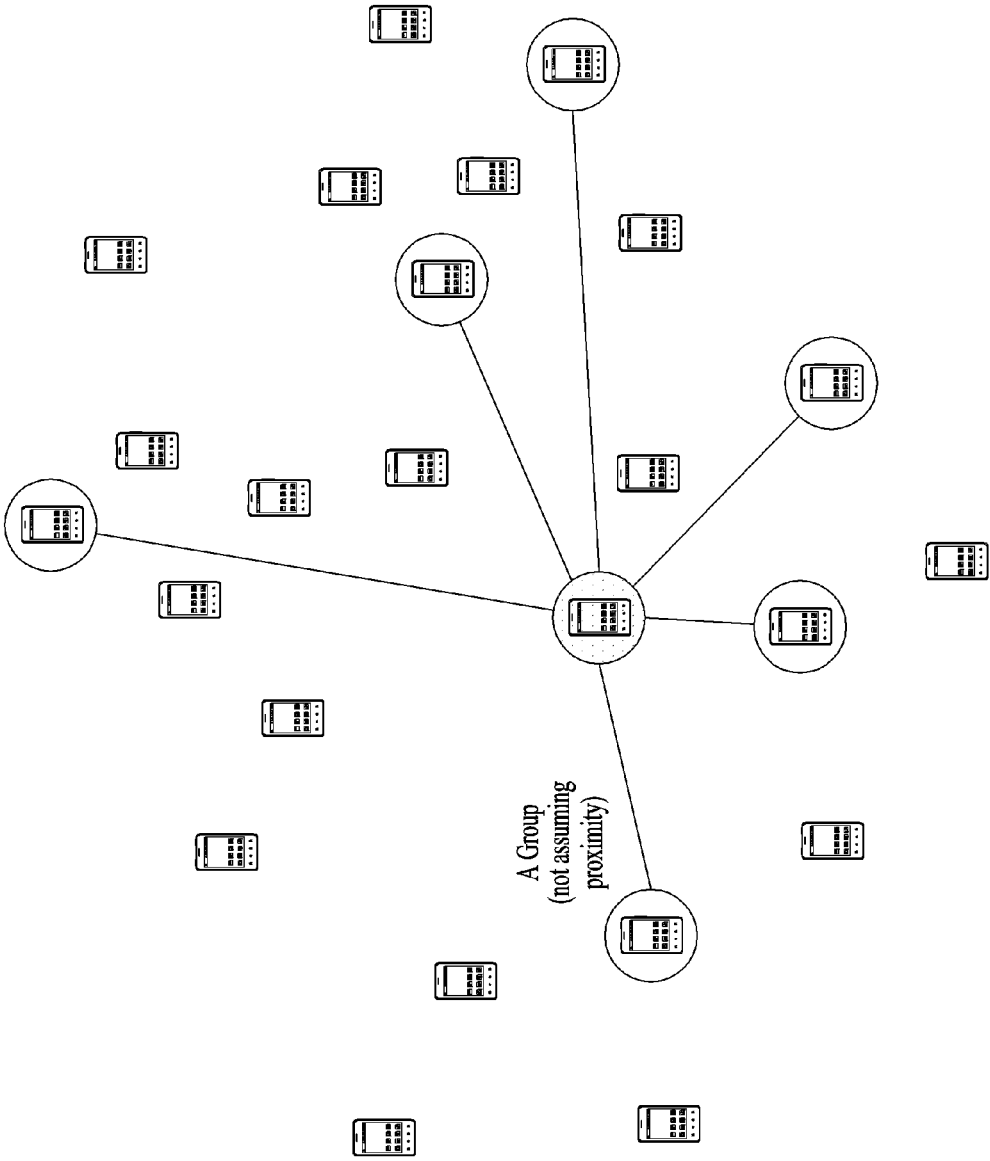
FIG. 12 illustrates an example of configuring a user equipment (UE) group according to the present invention.

FIG. 12 illustrates an example of configuring a user equipment (UE) group regardless of regionality or proximity. For example, the UE group may be configured in accordance with the service type.

In the proposed method, since the LR-DS is transmitted at a high transmission power in order to perform long range transmission, a signal may be delivered to a UE of a large area, which may cause interference to other UEs and the base station and, in case a LR-DS (e.g., a LR-DS of another agent UE) using the same resource exists, collision between the LR-DSs may occur. Accordingly, the LR-DS transmission resource may be assigned to not be overlapped (i.e., exclusively) for each group agent. Additionally, in the proposed method, it is assumed that the level of interference caused by the LR-DS to other groups is the same as/similar to the SR-DS interference level between the members of the group. More specifically, a significant degradation in the intensity of a DS signal is considered based upon pathloss, and so on. However, the LR-DS transmission of an agent UE may cause a significant level of influence on the SR-DS transmission of a member UE belonging to the same group, and, due to such influence, the SR-DS transmission itself may become impossible to perform. Considering this factor, it will be preferable to perform resource allocation (or assignment) so that the LR-DS transmission resource of an agent UE and the SR-DS transmission resource of a group member within the same group do not overlap one another.

For example, since the LR-DS transmitted by the agent UE shall be monitored by other agent UEs, the SR-DS transmission of group members within the corresponding resource area may be required to be restricted. More specifically, the SR-DS transmission of a group member may be required to be unauthorized. If an agent UE has a function of scheduling DS transmission resource to a group member, the agent UE may not allocate (or assign) the SR-DS transmission resource to the LR-DS transmission resource (or reserved resource for LR-DS transmission). Alternatively, the agent UE may detect whether or not the LR-DS transmission resource has been used, and, then, the agent UE may authorize or allocate available LR-DS transmission resource to a group member, so that the group member can use the resource for SR-DS transmission.

Figure 13:
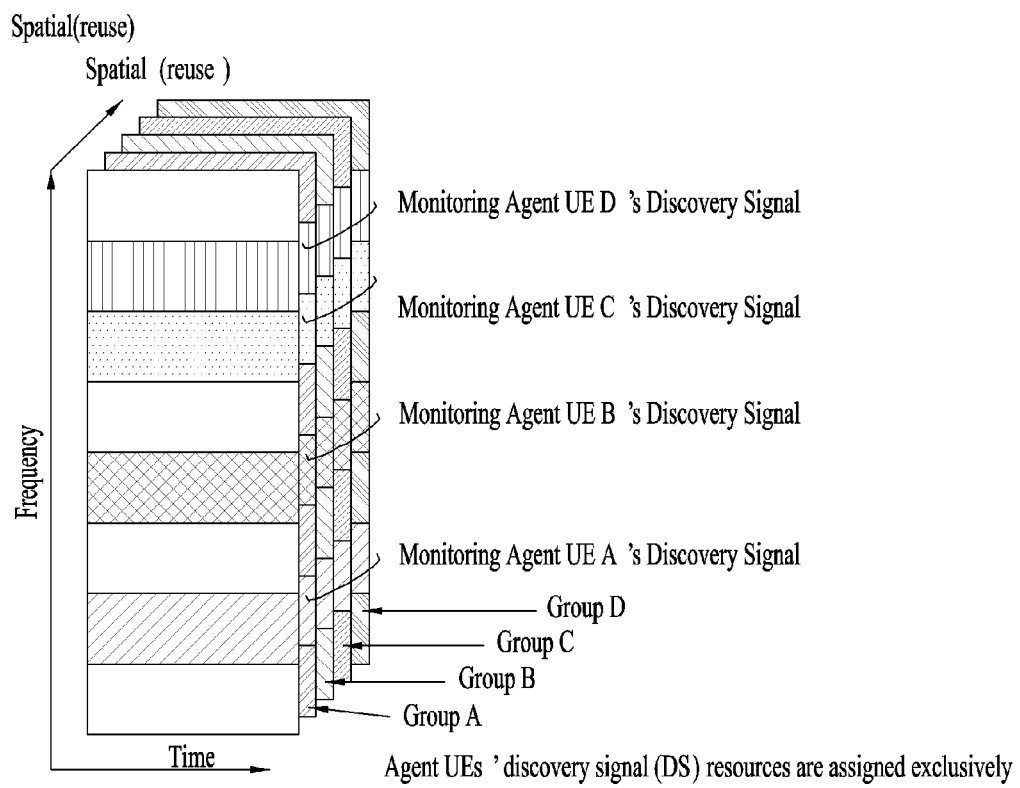
FIG. 13 illustrates an example of DS transmission resource allocation according to the present invention.

FIG. 13 illustrates an example of DS transmission resource allocation according to the present invention. Referring to FIG. 13, since the agent UE in each group is required to monitor the LR-DS of other agent UEs, within the corresponding resource area, the SR-DS transmission of a group member belonging to the same group as the respective agent UE may be required to be restricted. In other words, if an agent UE has a function of scheduling DS transmission resource to a group member, the agent UE may not allocate (or assign) the SR-DS transmission resource to the LR-DS transmission resource (or reserved resource for LR-DS transmission). Additionally, the agent UE may detect whether or not the LR-DS transmission resource has been used, and, then, the agent UE may authorize or allocate available LR-DS transmission resource to a group member, so that the group member can use the resource for SR-DS transmission. Meanwhile, resources outside of the resource area (Agent UE A DS~Agent UE D DS) that is occupied for the LR-DS transmission may be categorizes as resource that can be used/shared by group members. FIG. 13 illustrates an example of a case when the DS transmission resource of each group is multiplexed/allocated by using a SDM (Spatial Division Multiplexing) method and a case when the LR-/SR-DS transmission resource is multiplexed/allocated by using a FDM (Frequency Division Multiplexing) method. In the SDM method, the resource for group#a corresponds to a resource for antenna (port)#a or layer#a. Meanwhile, unlike what is shown in the drawing, the LR-/SR-DS transmission resource may be positioned in different time resources by using a TDM (Time Division Multiplexing) rule. More specifically, the LR-DS transmission resource may be allocated to subframe (set) A, and the SR-DS transmission resource may be allocated to subframe (set) B. Subframe (set) A and subframe (set) B are different from one another.

The agent UE may perform the proposed operations by using diverse methods. If an arbitrary UE within the group transmits a SR-DS, the agent UE receives the SR-DS. The arbitrary UE may transmit the SR-DS by using a power size (or power level) that is controlled, defined in advance. The SR-DS transmission power may have its initial transmission power decided based upon a power level, which is measured based upon a specific signal (e.g., pilot signal, synchronization signal, beacon signal, reference signal, and so on) of the agent UE, and, afterwards, based upon consistent measurement feedback, the transmission power size may be updated frequently or at constant intervals. Alternatively, for simple management, the DS may be transmitted at a pre-configured power size. Even in case of the latter method, although the power size may be configured at a specific time, since its frequency level is considerably low, the actual number of changes in the power level may not be very large.

Figure 14:
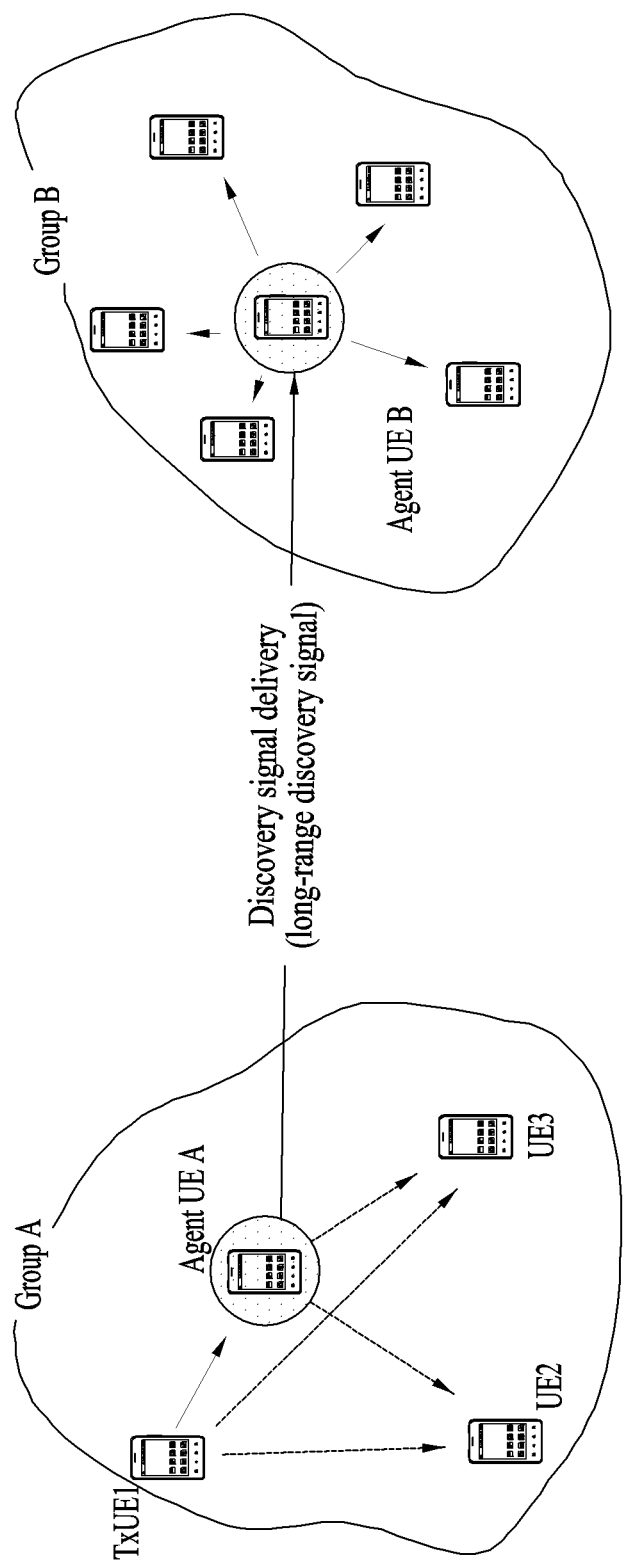
FIGS. 14~15 illustrate a DS transmission procedure according to the present invention.
Figure 15:
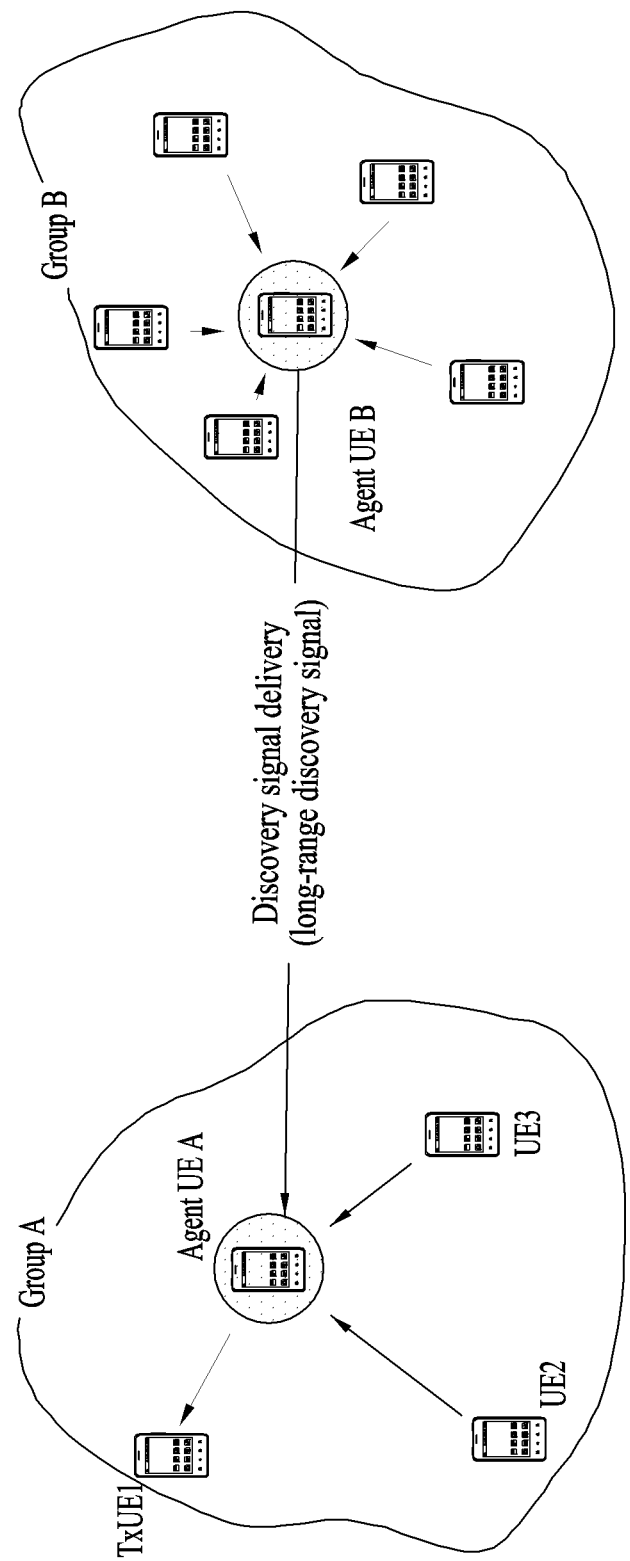

FIGS. 14~15 illustrate a DS transmission procedure according to the present invention. Referring to the drawing, TX UE1 may transmit SR-DS to Agent UE A, and Agent UE A may transmit the SR-DS or information of the TX UE1 to Agent UE B by using the LR-DS, and, then, finally, all members of Group B may receive the SR-DS or information of the TX UE1. In this example, the SR-DS transmission within the group may be relayed by the agent UE (i.e., after receiving the SR-DS of the group member, the agent UE broadcasts the received SR-DS to all UEs within the group), or the SR-DS transmission within the group may not be relayed by the agent UE, and only the LS-DS reception of another group may be relayed by the agent UE. Additionally, the agent UE may receive the SR-DS or information of another group member from another agent US, and, then, the agent UE may broadcast this to the members of its own group.

Referring to FIG. 14, it is assumed that Group A members are all capable of receiving the SR-DS of Tx UE1, and, accordingly, Agent UE A may also receive the SR-DS of Tx UE1. In this case, Agent UE A does not broadcast the DS of Tx UE1 to Group A and may only transmit the DS to other agent UEs. During this process, UE2 and UE3 within Group A may overhear the LR-DS, thereby being capable of acquiring additional coding gain respective to the DS of Tx UE1. More specifically, since the DS relay is configured of (i) a first step of having Tx UE1 transmit a SR-DS and (ii) a second step of having Agent UE A transmit a LR-DS, in order to deliver the DS of Tx UE1 to a member of Group A, in the first step, Tx UE 1 may directly deliver the SR-DS to group members/or, in the second step, a group member may overhear the LR-DS of Agent UE A. Alternatively, a coding gain may be acquired by hearing both DSs and adequately combining the two DSs. This is merely a difference in the realization method, and this may vary based upon the signal of any one of the two steps that can be more easily decoded. If the structures/formats of the LR-DS and the SR-DS are different from one another, receiving both the LR-DS and the SR-DS and combining them requires a separate decoding process, which leads to an increase in the level of complexity. However, if the structures/formats of the LR-DS and the SR-DS are the same, additional level of complexity may be reduced.

Referring to FIG. 15, conversely, in case Group A receives the LR-Ds, not only Agent UE A can receive the LR-DS but all of the group members (e.g., UE1, UE2, UE3) can receive the LR-Ds. In the LR-DS resource area, since the members of Group A are very likely to be prohibited from performing DS transmission/reception, the members of Group A may be allowed to be in a reception-enabled state (monitoring mode). In this operation mode, under the assumption that the LR-DS can be received, even if a group member is aware of the fact that an SR-DS does not exist (in the LR-DS resource area, if a LR-DS is detected by performing monitoring, the group member may perform decoding. More specifically, a member of Group A may directly receive a LR-DS of Agent UE B. In this method, Agent UE A is not required to additionally broadcast the LR-DS or information acquired from the LR-DS to the group members. Alternatively, a broadcasting function may be realized in Agent UE A for additional coding gain. Accordingly, when it is assumed that a default operation of a group member is to receive a DS signal, which is relayed by Agent UE A, directly receiving the LR-DS from Agent UE B may correspond to a supplemental operation. More specifically, depending upon whether the default operation is to be set to directly receiving the LR-DS or receiving the SR-DS that is relayed by an agent UE, operations other than the default operation may be considered as supplemental operations for additionally acquiring coding gain.

Figure 16:
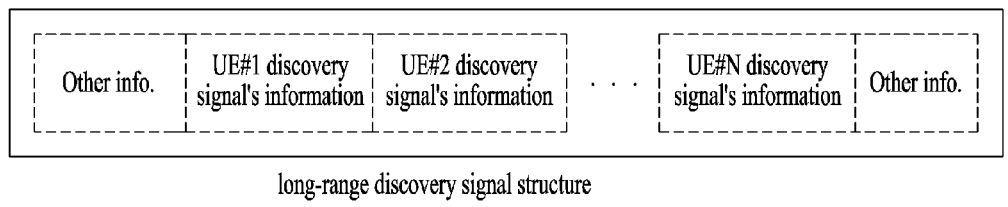
FIGS. 16~17 illustrate exemplary formats of a DS according to the present invention.
Figure 17:
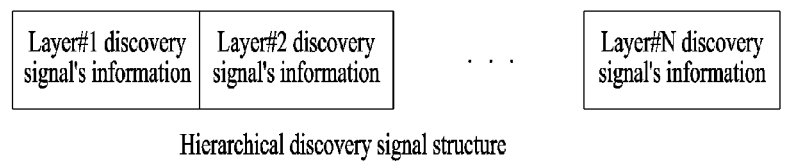

FIGS. 16~17 illustrate exemplary formats of a LR-DS. Diverse formats of the LR-DS may exist. In case the agent UE simply relays the SR-DS, the agent UE may generate a LR-DS by reproducing the SR-DS of the Tx UE1 without any modification. In this case, one LR-DS transmits one SR-DS. However, in this method, if a large number of group members exist, the LR-DS transmission resource may become insufficient, thereby preventing the LR-DS transmission from being carried out easily. As another embodiment, the LR-DS may be configured to include multiple sets of SR-DS information. For example, the agent UE may extract information that is to be delivered by the SR-DS of UE#1 along with information that is to be delivered by the DS of N number of UEs, and, by reconfiguring such information, the agent UE may generate a LR-DS (FIG. 16). Each set of DS information within the LR-DS may have a different format from that of the SR-DS. Additionally, within the layer structure, the LR-DSs may have different DS structures in accordance with the number of layers (FIG. 17).

In the description provided above, only two types of DSs have been broadly defined. One type corresponds to a DS for short range purpose, and the other type corresponds to a DS for long range purpose. By extending this concept, instead of merely categorizing the DS on the basis of distance, multiple DS types may be defined in accordance with layers of groups, which are grouped based upon the respective purpose. More specifically, the layers may be defined based upon the respective purpose, and a DS structure that is adequate to the respective layer may be defined. Alternatively, the layers may be defined based upon both the purpose and the distance, and a DS structure that is adequate to the respective layer may be defined. Different DS transmission power levels may be configured for each layer. This is because, if the DS reaching range or required SINR is different for each layer, an adequate value should be configured by a power control process.

As another embodiment, an extendable signal (e.g., LR-DS) structure of a method of encapsulating the DS or DS information may be considered. If a layer is added, by using a method of adding DS or DS information of the corresponding layer to a position corresponding to the layer within the signal, and, when the corresponding layer is departed, by using a method of interpreting such departure and removing the respective information, DS or DS information that is generated in each layer may be added to or removed from the respective layer within the signal.

Meanwhile, the agent UE may perform a special operation during the procedure of performing (i) DS receiving and listening mode function or (ii) collection and transmission mode function. More specifically, regardless of the reception point of the LR-DS, the agent UE may perform an operation of determining all member IDs of the members belonging to the same group as the agent UE in a background format. In order to do so, the agent UE may consistently manage the group members by periodically updating the group members. A case when such management is required corresponds to a case when the agent UE receives the DS and is required to send a response of whether or not the DS has been received. According to this example, when the SR-DS transmitted from a group member is delivered to another agent UE, and, afterwards, when another group member performs a request for verifying whether or not a specific UE exists among its group members (in order to continue the procedure of adding link connection, and so on), the agent UE may directly carry out the response to the request. More specifically, a group member ID is assigned to a specific agent UE, and, when another UE inquires on the presence of a UE respective to the assigned ID, the agent UE may immediately notify the presence or absence of the corresponding UE. Otherwise, the agent UE receives all of the SR-DSs transmitted from the group members, and, since the agent UE sends a response to the presence or absence of the requested UE after determining each group member in accordance with the reception result (i.e., result gained from performing monitoring during a DS cycle), latency may be increased.

Figure 18:
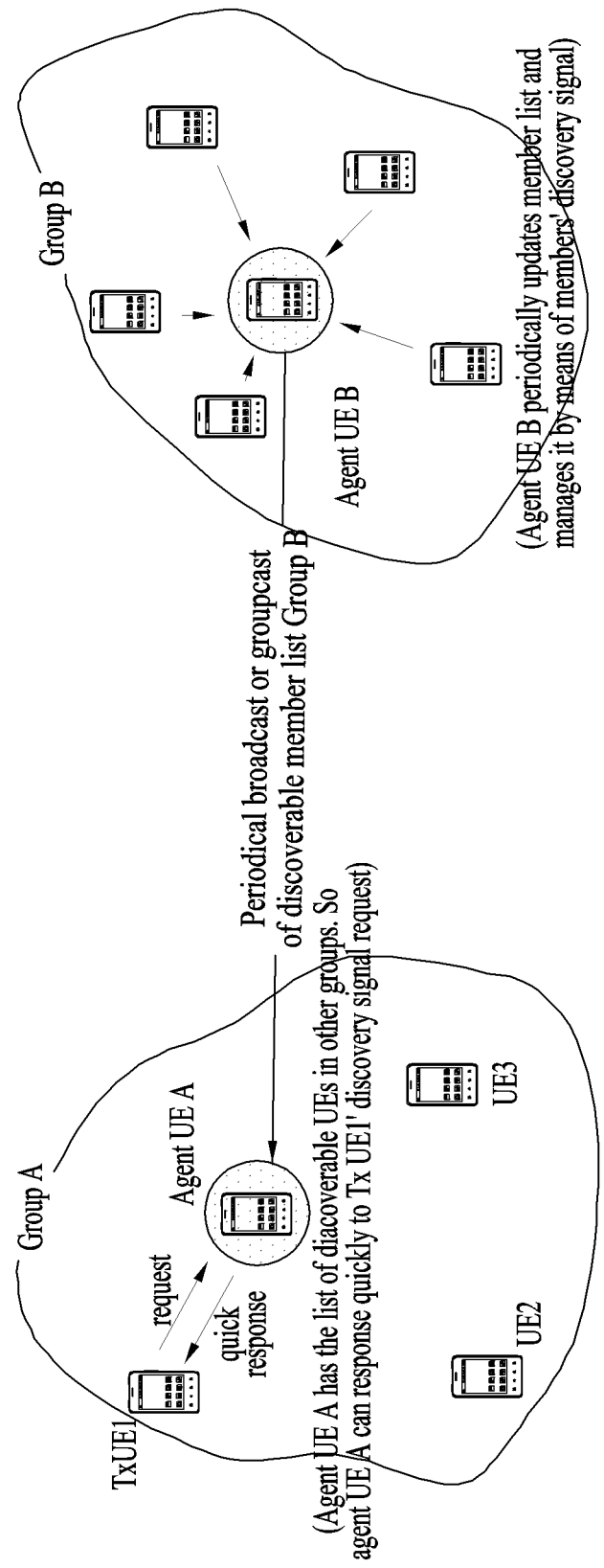
FIG. 18 illustrates a DS transmission procedure according to the present invention.

FIG. 18 illustrates a DS transmission procedure according to the present invention. Referring to FIG. 18, under the assumption that the agent UE consistently manages the member list, the agent UE may configure a DS on the member list in a LR-DS format and may periodically broadcast the DS. More specifically, the agent UE may notify the list of group members to another agent UE (via broadcast or groupcast), and, then, discovery may be performed based upon a discoverable UE. This solution may be more efficient than the method of collecting the DS of individual members, configuring a LR-DS (based upon a request), and delivering the configured LR-DS.

Most particularly, if agent UEs periodically share discoverable UEs within each group and have a recent list, when a member UE of its own group sends a SR-DS in order to search for a specific UE, each agent UE may search for (or discover) a wanted UE ID (or service ID from the list of discoverable UEs it possesses. In case the wanted UE ID (or service ID) is discovered from the list of discoverable UEs, the agent UE may swiftly and immediately deliver the information on the UE and even its location information (group location) to the group member without having to perform LR-DS generation/exchange. In this aspect, it may be understood that the agent UE acts as a proxy performing the function of discovery. More specifically, even if the DS is not broadcasted to the entire group in accordance with the request of a specific UE, the agent UE may immediately notify the discovery result based upon the list of discoverable UEs it possesses. Accordingly, all UEs may deliver a SR-DS only to the agent UE, and the agent UE may immediately search the DB and send respective responses. Unlike the conventional method of having all UEs individually transmit a SR-DS and discovering the neighboring UE by performing monitoring, this method is basically similar to the background operation based upon an agent UE, which corresponds to a method of sharing UE discovery result among the agent UEs, managing such shared information in a DB, and adequately updating the DB. In this method, the LR-DS is used as a channel having the purpose of inter-exchanging UE discovery information among groups, and the actual DS may be considered to exist only as the SR-DS.

Figure 19:
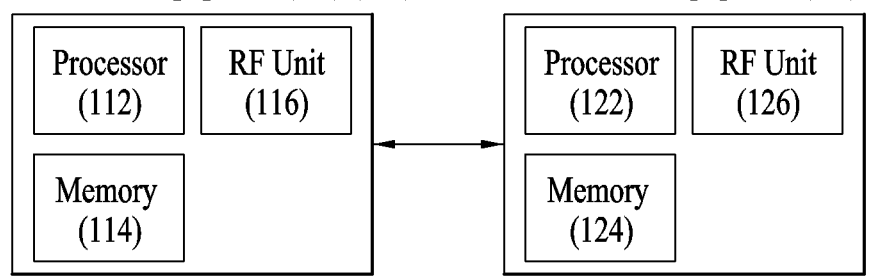
FIG. 19 is a block diagram of a User Equipment (UE) according to an embodiment of the present invention.

FIG. 19 is a block diagram of a User Equipment (UE) according to an embodiment of the present invention.

Referring to FIG. 19, a first D2D user equipment (UE; 110) and a second D2D user equipment (UE; 120) may perform direct communication without passing through a network. The first D2D UE (110) includes a processor (112), a memory (114), and a Radio Frequency (RF) unit (116). The processor (112) may be configured to realize the procedures and/or methods proposed in the present invention. The memory (114) is connected to the processor (112) and stores diverse information related to the operations of the processor (112). The RF unit (116) is connected to the processor (112) and transmits and/or receives radio signals. The second D2D UE (120) includes a processor (122), a memory (124), and a Radio Frequency (RF) unit (126). The processor (122) may be configured to realize the procedures and/or methods proposed in the present invention. The memory (124) is connected to the processor (122) and stores diverse information related to the operations of the processor (122). The RF unit (126) is connected to the processor (122) and transmits and/or receives radio signals.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with a UE may be performed by the BS or network nodes other than the BS. The term 'BS' may be replaced with the term fixed station, Node B, evolved Node B (eNode B or eNB), Access Point (AP), etc. The term 'terminal' may be replaced with the term UE, Mobile Station (MS), Mobile Subscriber Station (MSS), Subscriber Station (SS), etc.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention may be applied to a method and device using D2D communication in a wireless communication system.

What is claimed is:

1. A method of performing a discovery procedure for Device-to-Device (D2D) communication by a device in a wireless communication system, the method comprising:
    receiving a first Discovery Signal (DS) including identification information of a target user equipment from a member user equipment of a first user equipment group;
    verifying whether or not the target user equipment belongs to the first user equipment group; and
    transmitting a second DS corresponding to the first DS,
    wherein, when the target user equipment belongs to the first user equipment group, the second DS is transmitted to member user equipments within the first user equipment group using a shared resource which is Spatial Division Multiplexing (SDM) multiplexed by members of the first user equipment group,
    wherein, when the target user equipment does not belong to the first user equipment group, the second DS is transmitted to a specific user equipment within a second group that is different from the first group using a dedicated resource that is not shared by members of the first user equipment group, and
    wherein the shared resource and the dedicated resource are multiplexed by using a Frequency Division Multiplexing (FDM) method.

2. The method of claim 1, wherein, when the target user equipment belongs to the first user equipment group, the second DS is transmitted by using a first transmission power,
    wherein, when the target user equipment does not belong to the first user equipment group, the second DS is transmitted by using a second transmission power, and
    wherein the first transmission power is lower than the second transmission power.

3. The method of claim 1, wherein the second DS includes a plurality of first DSs.

4. A device for performing a discovery procedure for Device-to-Device (D2D) communication in a wireless communication system, the device comprising:
    a Radio Frequency (RF) unit; and
    a processor,
    wherein the processor is configured to:
        receive a first Discovery Signal (DS) including identification information of a target user equipment from a member user equipment of a first user equipment group, to
        verify whether or not the target user equipment belongs to the first user equipment group, and
        transmit a second DS corresponding to the first DS,
    wherein, when the target user equipment belongs to the first user equipment group, the second DS is transmitted to member user equipments within the first user equipment group using a shared resource which is Spatial Division Multiplexing (SDM) multiplexed by members of the first user equipment group,
    wherein, when the target user equipment does not belong to the first user equipment group, the second DS is transmitted to a specific user equipment within a second group that is different from the first group using a dedicated resource that is not shared by members of the first user equipment group, and
    wherein the shared resource and the dedicated resource are multiplexed by using a Frequency Division Multiplexing (FDM) method.

5. The device of claim 4, wherein, when the target user equipment belongs to the first user equipment group, the second DS is transmitted by using a first transmission power, wherein, when the target user equipment does not belong to the first user equipment group, the second DS is transmitted by using a second transmission power, and wherein the first transmission power is lower than the second transmission power.

6. The device of claim 4, wherein the second DS includes a plurality of first DSs.

\* \* \* \* \*